United States Patent [19]

Meyerhoefer et al.

[11] Patent Number: 4,904,211
[45] Date of Patent: Feb. 27, 1990

[54] FRAME CRADLE FOR TELEPHONE CONNECTOR BLOCKS

[75] Inventors: Carl Meyerhoefer, Dix Hills; Helmuth Neuwirth, Garden City, both of N.Y.

[73] Assignee: Porta Systems Corp., Syosset, N.Y.

[21] Appl. No.: 332,529

[22] Filed: Apr. 3, 1989

[51] Int. Cl.$^4$ .............................................. H01R 9/22
[52] U.S. Cl. ................... 439/719; 439/532; 439/712; 361/428
[58] Field of Search ............... 439/719, 709, 715, 716, 439/717, 718, 532; 361/427, 428, 429; 379/325, 326, 327

[56] References Cited

U.S. PATENT DOCUMENTS 2,082,099  6/1937  Cruser .......................... 439/712 X
3,909,505  9/1975  Taylor .......................... 361/428 X
4,581,489  4/1986  Nozick .......................... 439/716 X

FOREIGN PATENT DOCUMENTS 2612031  9/1988  France .......................... 379/326

Primary Examiner—Neil Abrams
Assistant Examiner—Khiem Nguyen
Attorney, Agent, or Firm—Charles E. Temko

[57] ABSTRACT

A multiple cradle structure for use in supporting a plurality of cradle-mounted telephone connector blocks upon a main frame or backboard wherein the wired blocks may be pressed into position to be supported thereon. The cradle is configured to provide separate passages for outside plant cable and inside office wiring so as to maintain cross talk and noise on individual subscriber pairs at a minimum.

3 Claims, 2 Drawing Sheets

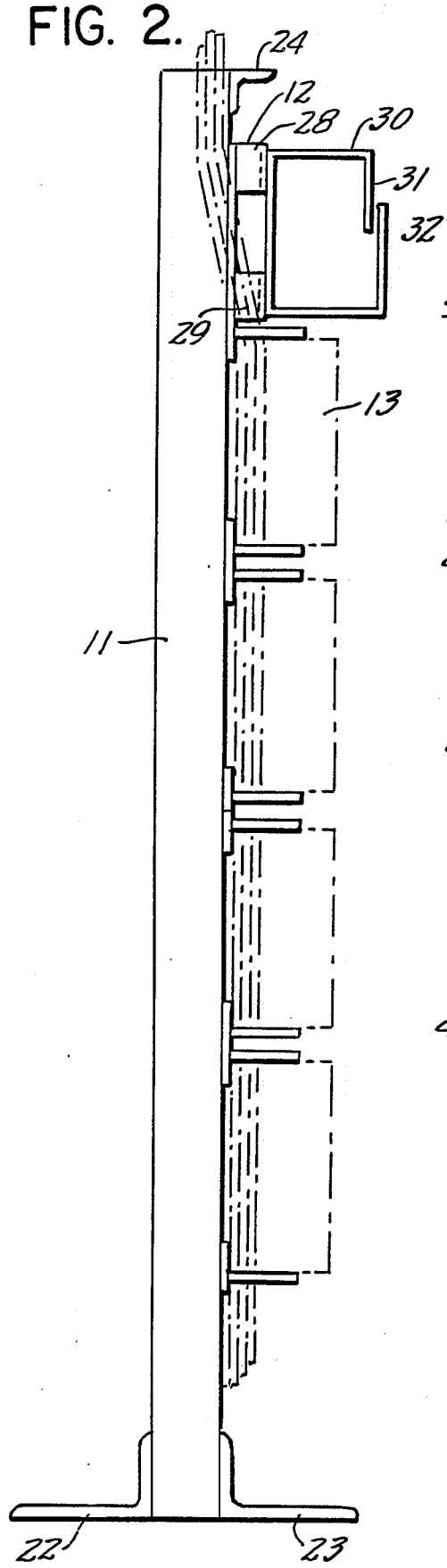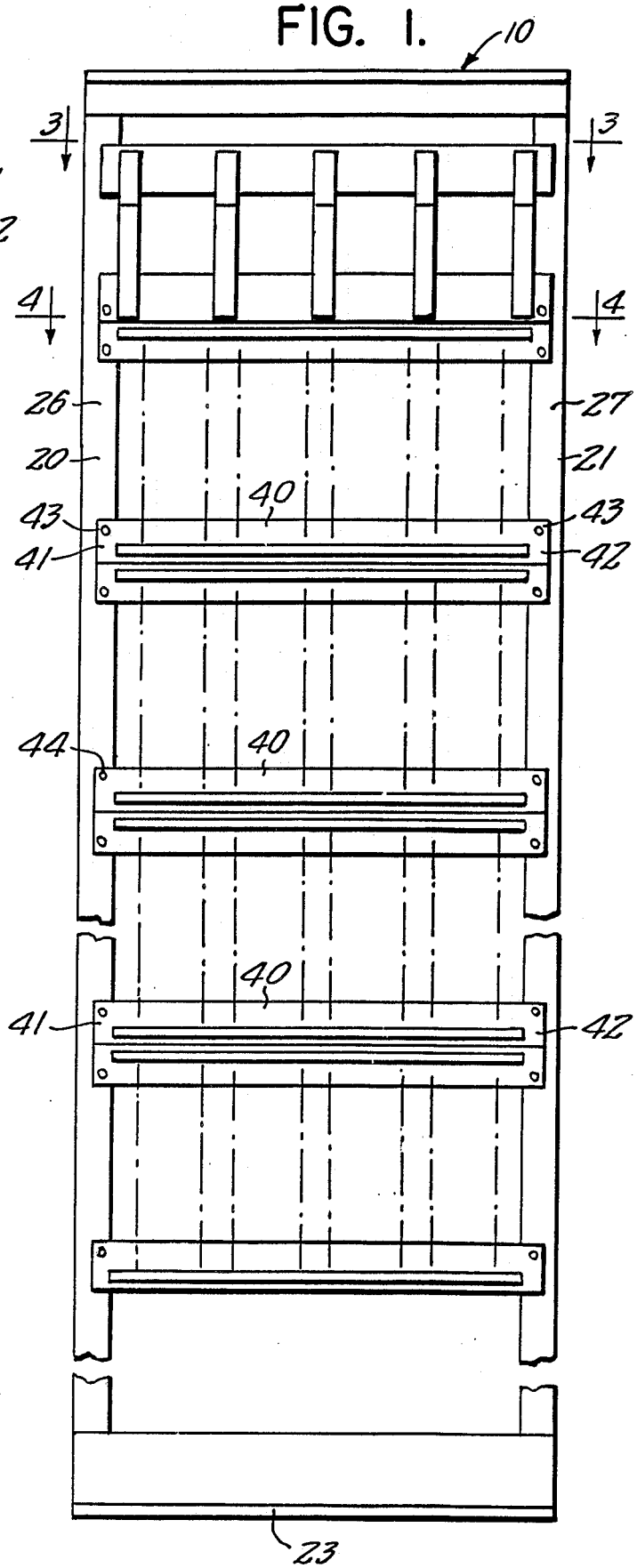

FRAME CRADLE FOR TELEPHONE CONNECTOR BLOCKS

BACKGROUND OF THE INVENTION

This invention relates generally to the field of telephony, and more particularly to an improved cradle construction suitable for use in mounting plural connector blocks upon a main frame, backboard or similar mounting location. Devices of this general type are known in the art, and the invention lies in the specific constructional details which permit improved convenience in wiring the blocks and improved maintenance of static, noise and cross talk during operation of the supported subscriber pairs at a relatively low level.

In copending application, Ser. No. 07/144,040 filed Jan. 15, 1988 now U.S. Pat. No. 4,824,403 entitled Telephone Connector Block for Cradle Type Installation assigned to the same assignee as the present application, there is disclosed an improved cradle mounted telephone connector block of a type contemplated by the present invention. Such blocks are characterized in the provision of a generally rectangular body having rear edge areas having recesses which are resiliently engaged and maintained by finger-like structure which enters the recesses, the fingers forming part of a mounting cradle. This type of structure permits wiring of the blocks with incoming outside plant cables and inside conductors leading to office equipment, while the block is in detached condition, following which the block is pressed into position on the cradle which has been previously mounted to a planar supporting surface. In the prior art cradle structure, a separate cradle is provided for each block, and little attention has been paid to the connecting of cables and wires leading to and from the block. In such construction, the outside plant and inside plant conductors may be placed in close juxtaposition, causing a high degree of cross talk and other interference in the subscriber circuits caused by induction. Further, such construction requires the separate mounting of each cradle which can be aligned with other cradles in order to result in the mounting of aligned connector blocks.

SUMMARY OF THE INVENTION

Briefly stated, the invention contemplates the provision of an improved cradle construction of the class described, in which the above-mentioned problems have been substantially reduced if not completely eliminated. To this end, the disclosed cradle structure is of unitary molded configuration of standardized length to permit mounting upon a telephone main frame or relay rack. Extending laterally outwardly from a transversely extending base wall are a plurality of flexible elements which define a plurality of first enclosed areas for accommodation of outside plant cable, and a plurality of second enclosed areas for accommodating inside plant cable in mutually spaced relation. When the blocks are mounted in generally mutually parallel orientation, a cradle is provided at each of the upper and lower ends of each block to provide minimum interference with the passage of wiring to and from the connecting points on the blocks. The frame or rack upon which the blocks are mounted form fanning ring structures for guiding wiring to the individual blocks in known manner.

BRIEF DESCRIPTION OF THE DRAWINGS

In the drawings, to which reference will be made in the specification, similar reference characters have been employed to designate corresponding parts throughout the several views.

FIG. 1 is a front elevational view of an embodiment of the invention.

FIG. 2 is a side elevational view thereof.

DETAILED DESCRIPTION OF THE DISCLOSED EMBODIMENT

Figure 3:
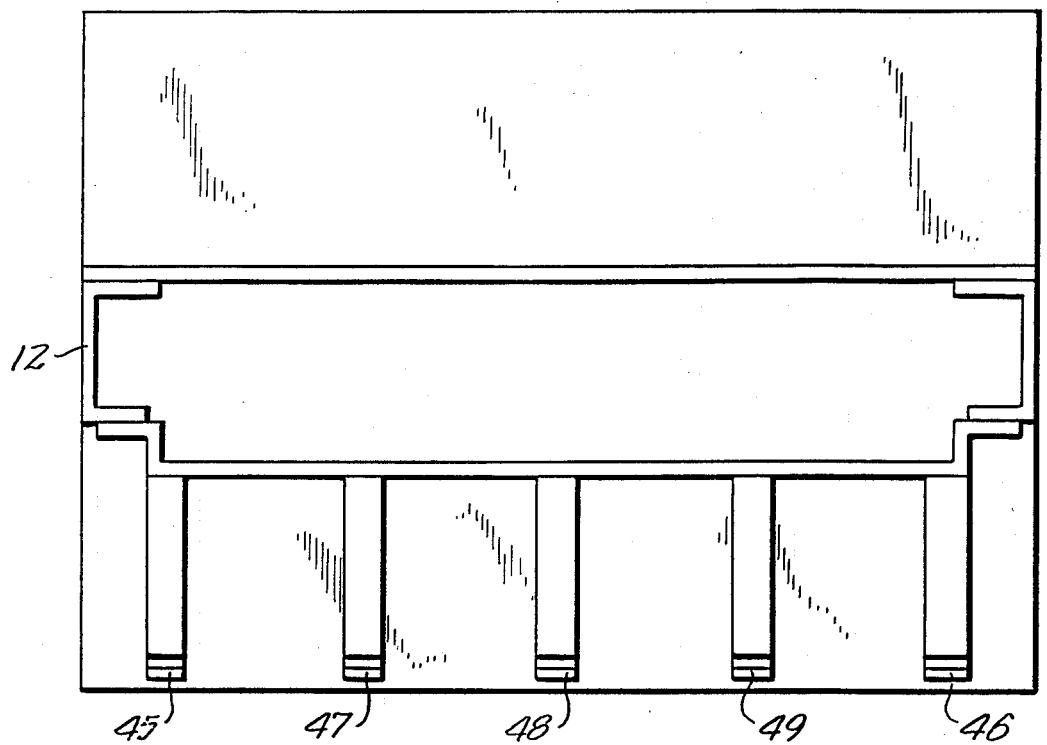
FIG. 3 is a transverse sectional view thereof, as seen from the plane 3—3 in FIG. 1.

In accordance with the invention, the device, generally indicated by reference character 10, comprises broadly a frame or relay rack element 11, a plurality of cradle elements 12, and a plurality of cradle-type connector blocks 13.

The frame or rack element 11 may be of known metallic construction, including a pair of vertical wall members 20 and 21, floor mounting brackets 22 and 23, and a ceiling mounting bracket 24. The wall members 20 and 21 include front surfaces 26 and 27 which are interconnected by first and second transverse members 28 and 29 which support plural fanning rings 30 and form a wiring trough. The rings 30 are of conventional type, including overlapping members 31 and 32 whereby to permit the introduction of conductors therein.

The cradle elements 12 are substantially similar, and accordingly, a detailed description of one of said elements will serve to describe all. The elements 12 are preferably integrally molded from synthetic resinous materials, and include an elongated base wall 40 having first and second ends 41 and 42 including mounting holes 43 for reception of screws 44 to interconnect the same with the wall members 20-21. Extending from one of two parallel surfaces are a pair of laterally extending end members 45 and 46 and a plurality of laterally extending medially positioned members 47, 48 and 49.

The end members 45-46 include a planar arm 50 having an inner end 51 and an outer end enlargement 52. A flexible hook 53 is carried by the arm 50 on one side thereof, the hook including first, second and third portions 54, 55 and 56, respectively, terminating in a free end edge 57. The portions 54-56 define a generally rectangularly shaped enclosed area 58 adapted to retain plural conductors leading to central office equipment (not shown). An outer surface 59 supports an abutment 60 and a projection 61 which engages a corresponding recess 62 at an end of a block 13.

The medially positioned members 47-49 are generally similar, including planar arms 66 having an inner end 67 and an outer end 68. They are provided with first and second flexible hooks 69 and 70 of similar configuration which are oppositely positioned as best seen in FIG. 4 in the drawing.

Figure 4:
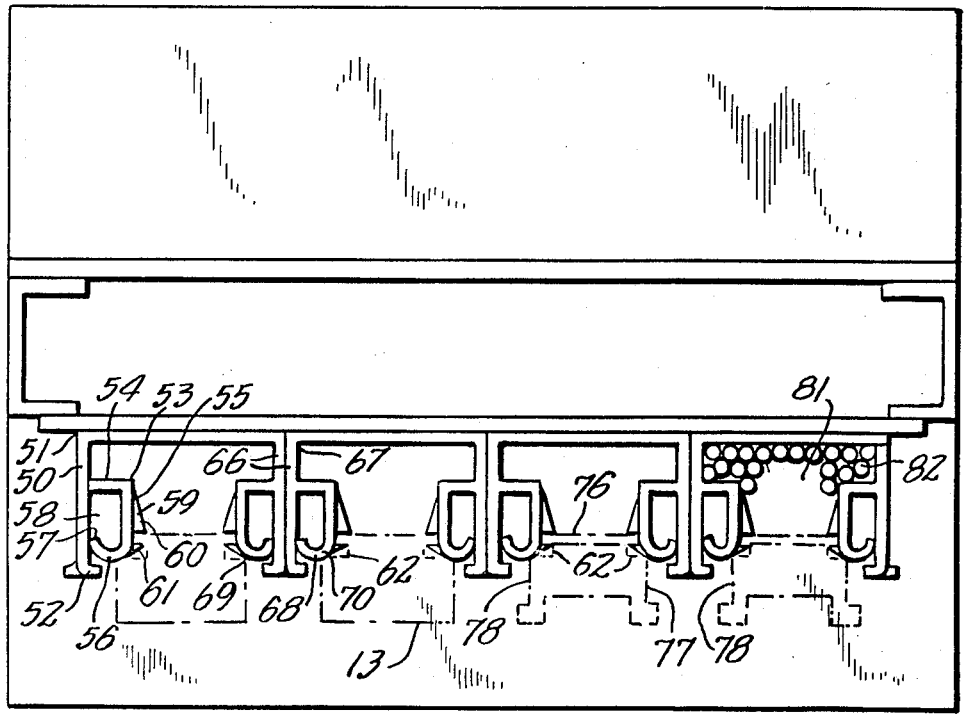
FIG. 4 is a transverse sectional view thereof as seen from the plane 4—4 in FIG. 1.

The blocks 13 are of known types, and of generally rectangular configuration, again, as best seen in FIG. 4. Each is bounded by a rear wall 76, and a pair of oppositely disposed side walls 77 and 78, each of which is provided with plural recesses 62 which engage the projections 61 when pressed into position. When a block is positioned between a pair of adjacent flexible hooks, there is thereby formed a rectangularly shaped enclosure 81 which is adapted to retain outside plant cables 82 in spaced relation with respect to the inside plant conductors retained by the flexible hooks 53. This provision facilitates the separation between incoming and outgoing conductors, and materially reduces the generation of inductive currents occurring during signal transmission through individual subscriber circuits.

In the embodiment disclosed, cradle elements 12 are positioned so as to engage one end of each of a plurality of aligned blocks so that individual blocks may be connected or disconnected from the cradles without disturbing any of the remaining blocks. Where the blocks are of unusually large size, it is possible to provide an intermediate cradle engaging the blocks at a medial point on the side surfaces thereof.

We wish it to be understood that we do not consider the invention to be limited to the precise details of structure shown and set forth in this specification, for obvious modifications will occur to those skilled in the art to which the invention pertains.

We claim:

1. An improved cradle for mounting plural telephone connector blocks of rectangular configuration comprising an elongated planar base wall having first and second opposed ends, means for mounting said ends upon a supporting surface; a plurality of flexible laterally extending members projecting from a surface of said base wall, said laterally extending members having generally planar opposed side surfaces; and a flexible hook member carried by at least one of said side surfaces and extending in a plane perpendicular to the plane of said base wall, said hook member having inner and outer surfaces; the inner surface of said hook member defining a first an enclosed area for the reception of a group of elongated conductors, the outer surface of said hook member having resilient means for engaging a corresponding recess in a telephone connector block.

2. An improved cradle in accordance with claim 1, further characterized in said laterally extending members having a pair of flexible hook members, one on each of said opposing surfaces, whereby to each engage one of a pair of connector blocks in spaced parallel relation.

3. An improved cradle in accordance with claim 2, in combination with a pair of engaged connector blocks wherein engagement of said connector blocks serving to form a second enclosed area in spaced relation with respect to said first-mentioned enclosed area for the retention of additional conductors.

* * * * *